United States Patent [19]

Law et al.

[11] Patent Number: 5,139,910
[45] Date of Patent: Aug. 18, 1992

[54] PHOTOCONDUCTIVE IMAGING MEMBERS WITH BISAZO COMPOSITIONS

[75] Inventors: Kock-Yee Law, Penfield; Ihor W. Tarnawskyj, Rochester, both of N.Y.

[73] Assignee: Xerox Corporation, Stamford, Conn.

[21] Appl. No.: 631,831

[22] Filed: Dec. 21, 1990

[51] Int. Cl.$^5$ .............................................. G03G 5/06
[52] U.S. Cl. .................................. 430/59; 430/58; 430/72
[58] Field of Search .................. 430/59, 58, 60, 72

[56] References Cited

U.S. PATENT DOCUMENTS

| | | |
|---|---|---|
| 3,898,084 | 8/1975 | Champ et al. .................. 96/1.5 |
| 4,299,896 | 11/1981 | Hashimoto et al. ............ 430/58 |
| 4,314,015 | 2/1982 | Hashimoto et al. ............ 430/58 |
| 4,390,611 | 6/1983 | Ishikawa et al. ............... 430/59 |
| 4,551,404 | 11/1985 | Hiro et al. ....................... 430/59 |
| 4,666,810 | 5/1987 | Umehara et al. ............... 430/71 |
| 4,797,337 | 1/1989 | Law et al. ........................ 430/58 |
| 4,833,052 | 5/1989 | Law et al. ........................ 430/58 |
| 4,886,722 | 12/1989 | Law et al. ........................ 430/59 |
| 4,963,449 | 10/1990 | Tanaka et al. .................. 430/59 |

Primary Examiner—Marion E. McCamish
Assistant Examiner—S. Rosasco
Attorney, Agent, or Firm—E. O. Palazzo

[57] ABSTRACT

Bisazo compounds essentially as represented by the formula of FIG. 9 wherein Cp is an azoic coupler.

35 Claims, 7 Drawing Sheets

PHOTOCONDUCTIVE IMAGING MEMBERS WITH BISAZO COMPOSITIONS

BACKGROUND OF THE INVENTION

This invention is generally directed to bisazo compositions and to processes for the preparation thereof. More specifically, the present invention is directed to bisazo photogenerating pigments prepared from thioxanthenediamine dioxide, and imaging members thereof. In one embodiment of the present invention, there are provided layered photoconductive imaging members with improved xerographic properties, inclusive of high charge acceptance, low dark decay, high photosensitivity, including photosensitivity in the wavelength regions of from about 400 to about 700 nanometers, enabling their selection for electrophotographic, especially xerographic, imaging systems and LED printers, which are usually sensitive to wavelengths of from about 600 to about 680 nanometers. In one embodiment of the invention of the present application, there are provided imaging members with photoconductive layers comprised of the bisazo pigments illustrated herein, and charge or hole transport layers, especially those comprised of aryl amines, which members are sensitive to light in the wavelength region of from about 400 to about 700 nanometers. The resulting members are responsive to visible light, and red illumination originating from LED printing apparatuses. The photoresponsive imaging members of the present invention can also, for example, contain situated between a photogenerating layer and a hole transporting layer, or situated between a photogenerating layer and a supporting substrate with a charge transport layer in contact with the photogenerating layer, a photoconductive composition comprised of the bisazo photogenerating pigments illustrated herein.

Imaging members with certain bisazo pigments are known, reference for example U.S. Pat. No. 3,898,084, which discloses, for example, the azo pigment Chlorodiane Blue in a photoconductive imaging member. Further, there are disclosed in the prior art layered photoresponsive devices, including those comprised of separate generating layers, and transport layers as described in U.S. Pat. No. 4,265,990, the disclosure of which is totally incorporated herein by reference; and overcoated photoresponsive materials containing a hole injecting layer overcoated with a hole transport layer, followed by an overcoating of a photogenerating layer; and a top coating of an insulating organic resin, reference U.S. Pat. No. 4,251,612. Examples of photogenerating layers disclosed in these patents include trigonal selenium and phthalocyanines, while examples of transport layers include certain diamines as mentioned therein.

In a patentability search report the following U.S. patents were listed: U.S. Pat. No. 4,299,896 which discloses imaging members with a photosensitive layer selected from the disazo pigments of the formulas illustrated, for example, in the Abstract, and in column 2; U.S. Pat. No. 4,314,015 wherein the disazo pigments for the imaging member are of the formula as illustrated in the Abstract, for example, and column 2; U.S. Pat. No. 4,666,810 wherein the azo pigments are illustrated in column 2 for example; and U.S. Pat. No. 4,797,337 wherein the disazo photogenerating pigment is of the formula as illustrated in the abstract, for example, which disazos may contain a $SO_2$ group.

U.S. Pat. No. 3,574,181 discloses disazo compounds useful as coloring agents. Composite electrophotographic photosensitive materials containing various azo compounds are disclosed in U.S. Pat. No. 4,618,672, wherein bisazo compounds particularly suitable for use in the charge generating layer of a layered electrophotographic photoconductor are illustrated. Similarly, an article by M. Hashimoto entitled "Electrophotographic Sensitivity of Fluorenone Bisazo Pigments," Electrophotography, Vol. 25, No. 3 (1986), discloses disazo compounds as charge generating materials in electrophotographic layered photoreceptors. Further, Japanese Patent Kokai No. 54-20736 discloses disazo pigments as constituents in electrophotographic processes. Japanese Patent 58-177955 also discloses many disazo compounds suitable for use in the photosensitive layer of an electrophotographic device.

U.S. Pat. No. 4,713,307, the disclosure of which is hereby totally incorporated herein by reference, also discloses photoconductive imaging members containing a supporting substrate, certain azo pigments as photogenerating materials, and a hole transport layer that preferably contains an aryl diamine compound dispersed in an inactive resinous binder.

U.S. Pat. No. 4,797,337, the disclosure of which is totally incorporated herein by reference, discloses a photoconductive imaging member comprising a supporting substrate, a hole transport layer, and a photogenerating layer comprising specific disazo compounds.

Additional references illustrating layered organic electrophotographic photoconductor elements with azo, bisazo, and related compounds include U.S. Pat. No. 4,390,611, U.S. Pat. No. 4,551,404, U.S. Pat. No. 4,596,754, Japanese Patent 60-64354, U.S. Pat. No. 4,400,455, U.S. Pat. No. 4,390,608, U.S. Pat. No. 4,327,168, U.S. Pat. No. 4,299,896, U.S. Pat. No. 4,314,015, U.S. Pat. No. 4,486,522, U.S. Pat. No. 4,486,519, U.S. Pat. No. 4,555,667, U.S. Pat. No. 4,440,845, U.S. Pat. No. 4,486,800, U.S. Pat. No. 4,309,611, U.S. Pat. No. 4,418,133, U.S. Pat. No. 4,293,628, U.S. Pat. No. 4,427,753, U.S. Pat. No. 4,495,264, U.S. Pat. No. 4,359,513, U.S. Pat. No. 3,898,084, U.S. Pat. No. 4,830,944, U.S. Pat. No. 4,820,602, and Japanese Patent Publication 60-111247.

In U.S. Pat. No. 4,833,052, the disclosure of which is totally incorporated herein by reference there are illustrated certain bisazo photoconductive imaging members. Examples of bisazo compounds disclosed in this patent include those of the formulas as illustrated in column 4, such as 4,4'-bis(1"-azo-2"-hydroxy-3"-naphthanilide)-1,1'-dianthraquinonylamine.

U.S. Pat. No. 4,755,443 discloses a photoreceptor for electrophotography which comprises a charge carrier generating material and charge transport material wherein one charge generating material is a metal phthalocyanine or a metal-free phthalocyanine. The layer containing the generator material also contains an organic amine. Other carrier generating substances can be used in combination with the phthalocyanine generator material, including azo pigments, anthraquinone dyes, perylene dyes, polycyclic quinone dyes, and methine stearate pigments.

U.S. Pat. No. 4,424,266 discloses an electrophotographic photosensitive element having a conductive support and a photosensitive layer comprising a carrier generating phase layer containing a carrier generating material selected from the group consisting of perylene dyes, polycyclic quinones, and azo dyes, and a carrier transporting phase layer containing a hydrazone carrier transporting material. The carrier generator materials can be used either singly or in combination.

U.S. Pat. No. 4,882,254, the disclosure of which is totally incorporated herein by reference, discloses a layered photoresponsive imaging member which comprises a supporting substrate, a photogenerator layer comprising a mixture of first and second pigments, and an aryl amine hole transport layer. The mixture of pigments is selected from perylenes and phthalocyanines, polycyclic quinones and phthalocyanines, or perinones and phthalocyanines.

Japanese Patent Publication J01-198-763 discloses an electrophotographic photoreceptor containing a bisazo series compound in a photosensitive layer formed on a conductive support. A charge transport material is used with the bisazo pigment as a charge generation material, such as 2,4,7-trinitrofluorenone, tetracyanoquinodimethane, carbazole, triarylalkane derivatives, phenylenediamine derivatives, hydrazone compounds, or stilbene derivatives.

Photoresponsive imaging members containing perinone and perylene compounds are also known. For example, European Patent Publication 0040402, DE3019326, filed May 21, 1980, discloses the use of N,N'-disubstituted perylene-3,4,9,10-tetracarboxyldiimide pigments as photoconductive substances. Specifically, there are disclosed in this publication evaporated N,N'-bis(3-methoxypropyl)perylene-3,4,9,10-tetracarboxyldiimide dual layered negatively charged photoreceptors with improved spectral response in the wavelength region of 400 to 700 nanometers. A similar disclosure is contained in Ernst Gunther Schlosser, *Journal of Applied Photographic Engineering*, Vol. 4, No. 3, page 118 (1978). Further, U.S. Pat. No. 3,871,882 discloses photoconductive substances comprising specific perylene-3,4,9,10-tetracarboxylic acid derivative dyestuffs. According to the teachings of this patent, the photoconductive layer is preferably formed by vapor depositing the dyestuff in a vacuum. This patent discloses dual layer photoreceptors with perylene-3,4,9,10-tetracarboxylic acid diimide derivatives, which have spectral response in the wavelength region of from 400 to 600 nanometers. Additionally, U.S. Pat. No. 3,879,200 discloses imaging members with perinones. Furthermore, layered imaging members with imidazole thiazinoperinone photogenerators and related components are illustrated in U.S. Pat. No. 4,517,270 and in Japanese Laid Open Publications 59-58433/84 and 59-59692/84.

U.S. Pat. No. 4,808,506, the disclosure of which is totally incorporated herein by reference, discloses a layered photoresponsive imaging member which comprises a supporting substrate, an imidazole perinone comprising components with a mixture of cis and trans isomers of a specific formula, including trans indanthrene Brilliant Orange, cis indanthrene Bordeauxs Red, bis-(4,5-dimethyl)benzimidazole perinone and bis-2,3-naphthimidazole perinone, and an aryl amine hole transport layer.

U.S. Pat. No. 4,587,189, the disclosure of which is totally incorporated herein by reference, discloses a photoresponsive imaging member comprising a supporting substrate, a vacuum evaporated photogenerator layer which comprises a perylene pigment.

Imaging members with phthalocyanine materials are also known as disclosed in, for example, U.S. Pat. No. 3,594,163, U.S. Pat. No. 3,657,272, U.S. Pat. No. 3,816,118, U.S. Pat. No. 3,862,127, U.S. Pat. No. 3,903,107, U.S. Pat. No. 3,927,026, U.S. Pat. No. 3,932,180, U.S. Pat. No. 3,932,454, U.S. Pat. No. 4,031,109, U.S. Pat. No. 4,098,795, and U.S. Pat. No. Re. 27,117, the disclosures of each of which are totally incorporated herein by reference.

In U.S. Pat. No. 4,886,722, there is disclosed a photoconductive imaging member comprised of a supporting substrate, a hole transport layer, and a photogenerating layer comprising the unsymmetrical squaraines of the formula illustrated in claim 1; and in U.S. Pat. No. 4,833,052 there is illustrated a photoconductive imaging member comprised of a supporting substrate, a photogenerating layer comprised of a bisazo compound of the formula illustrated in claim 1, and a charge transport layer. The disclosures of each of these patents are totally incorporated herein by reference.

SUMMARY OF THE INVENTION

It is a feature of the present invention to provide certain bisazo compositions and processes for the preparation thereof.

Another feature of the present invention is to provide certain bisazo photogenerating pigments, and imaging members thereof, which members can be sensitive to wavelengths of from about 400 to about 700 and preferably from about 400 to about 680 nanometers.

In another feature of the present invention there are provided improved processes for preparing the bisazo photogenerating pigments illustrated herein from 3,6-thioxanthenediamine-10,10 dioxide.

Another feature of the present invention resides in the provision of bisazo photoresponsive imaging members which can possess excellent dark decay properties, high charge acceptance values, and electrical stability.

Further, in another feature of the present invention there are provided photoconductive imaging members that can be simultaneously responsive to visible light and radiation from LED devices.

Additionally, another feature of the present invention resides in the provision of imaging and printing methods with the photoconductive imaging members illustrated herein.

These and other features of the present invention in embodiments thereof can be accomplished by the provision of certain bisazo compounds, and imaging members thereof. More specifically, the present invention is directed to photoconductive imaging members with photoconductive bisazo compound compositions represented by the following formulas of FIGS. 4 to 9, with FIG. 9 being a general formula wherein Cp is an azoic coupler, as illustrated in copending application U.S. Ser. No. 07/617,234, the disclosure of which is totally incorporated herein by reference.

Illustrative examples of specific couplers include 2-hydroxy-3-naphthanilide, 2-hydroxy-3-naphtho-o-nitroanilide, and 2-hydroxy-3-naphtho-p-nitroanilide, available from Aldrich Chemical Company; 2-hydroxy-3-naphtho-o-methoxyanilide, 2-hydroxy--3-naphtho-p-methoxyanilide, 2-hydroxy-3-naphtho-o-methylanilide, 2-hydroxy-3-naphtho-p-chloroanilide, 2-hydroxy-3-naphtho-m-nitroanilide, all available from Pfaltz & Bauer Company; Naphthol AS-SG and Naphthol AS-GR, available from Sigma Corporation; 2-hydroxy-3-naphtho-p-methylanilide, 2-hydroxy-3- naphtho-m-methylanilide, 2-hydroxy-3-naphtho-p-fluoroanilide, 2-hydroxy-3-naphtho-o-fluoroanilide, 2-hydroxy-3-naphtho-o-chloroanilide, 2-hydroxy-3-naphtho-m-chloroanilide, 2-hydroxy-3-naphtho-p-bromoanilide, 2-hydroxy-3-naphtho-o-bromoanilide, 2-hydroxy-3-naphtho-p-trifluoromethylanilide, 2-hydroxy-3-naphtho-m-trifluoromethylanilide, 2-hydroxy-3-naphtho-o-ethylanilide, 3-hydroxy-1,8-benzimidazole-naphthalene, N-phenyl-3-hydroxyl-1,8-naphthalimide, 2-hydroxy-11H-benzo(a)carbazole-3-carbox-anilide, 2-hydroxy-11H-benzo(a)carbazole-3-carbox-p-methylanilide, 2-hydroxy-11H-benzo(a)carbazole-3-carbox-o-methylanilide, 2-hydroxy-11H-benzo(a)carbazole-3-carbox-o-ethylanilide, 2-hydroxy-11H-benzo(a)carbazole-3-carbox-p-fluoroanilide, 2-hydroxy-11H-benzo(a)carbazole-3-carbox-m-fluoroanilide, 2-hydroxy-11H-benzo(a)carbazole-3-carbox-p-chloroanilide, 2-hydroxy-11H-benzo(a)carbazole-3-carbox-m-chloroanilide, 2-hydroxy-11H-benzo(a)carbazole-3-carbox-o-chloroanilide, 2-hydroxy-11H-benzo(a)carbazole-3-carbox-p-bromoanilide, 2-hydroxy-11H-benzo(a)carbazole-3-carbox-o-trifluoromethylanilide, 2-hydroxy-11H-benzo(a)carbazole-3-carbox-p-trifluoromethylanilide, 2-hydroxy-11H-benzo(a)carbazole-3-carbox-m-nitroanilide, 2-hydroxy-11H-benzo(a)carbazole-3-carbox-p-nitroanilide, 2-hydroxy-8-chloro-11H-benzo(a)carbazole-3-carbox-anilide, 2-hydroxy-8-chloro-11H-benzo(a)carbazole-3-carbox-p-chloroanilide, 2-hydroxy-8-chloro-11H-benzo(a)carbazole-3-carbox-p-fluoroanilide, 2-hydroxy-8-chloro-11H-benzo(a)carbazole-3-carbox-o-methylanilide, and the like. Coupler compounds can also be synthesized by the method disclosed in German Patent 2,410,723, the disclosure of which is totally incorporated herein by reference.

The bisazos of the present invention can be prepared from 3,6-thioxanthenediamine-10,10-dioxide. More specifically, the bisazo compounds of the formula of FIG. 9 wherein Cp is a coupler can be generally prepared by initially tetrazotizing 3,6-thioxanthenediamine-10,10-dioxide with an excess amount, for example, from about 2 to about 10, and preferably from about 2 to about 5 equivalents of a metallic nitrite, such as sodium nitrite, at a temperature of from about $-10°$ to about $25°$ C. in an acid aqueous solution, such as a solution of hydrochloric acid. The tetrazonium salts formed can be isolated as the fluoroborate, or hexafluorophosphate salts by, for example, adding from about 2 to about 50, and preferably about 10 equivalents of $HBF_4$ or $HBF_6$ to the tetrazonium salt solution. Thereafter, the resulting salts can be dissolved in a solvent, such as dimethyl formamide at a temperature of about zero $(0°)$ to about $30°$ C., and the mixture resulting can be allowed to react with about 2 equivalents or more of an azoic coupler, such as 2-hydroxy-3-naphthanilide, at a temperature of from about zero $(0°)$ to about $30°$ C. Subsequently, the desired bisazo pigments are precipitated out of solution when about 2 equivalents of a base, such as sodium acetate is added thereto. Thereafter, the bisazo pigments can be isolated by, for example, filtration and purified by solvent washings, and more specifically washed with water for the primary purpose of removing any inorganic impurities, and washed with DMF for the primary purpose of removing any organic impurities. The bisazo products of the present invention can then be identified by elemental analysis, melting point, and IR spectroscopy. Further, carbon, hydrogen, sulfur nitrogen and oxygen elemental analysis can be selected for aiding in the identification of the products.

For the compounds as substantially represented by the formulas of FIGS. 4 to 8 the above process was repeated with the exceptions that the couplers selected were 2-hydroxy-3-naphthanilide, 2-hydroxy-11H-benzo(a)carbazole-3-carbox-o-ethylanilide, 2-hydroxy-11H-benzo(a)carbazole-3-carbox anilide, 2-hydroxy-11H-benzo(a)carbazole-3-carbox-p-chloroanilide, and 2-hydroxy-11H-benzo(a)carbazole-3-carbox-p-methoxyanilide.

The bisazo compounds of the present invention can be incorporated into various photoconductive imaging members. One such member is comprised of a supporting substrate, a hole transport layer, and as a photoconductive layer situated between the supporting substrate and the hole transport layer the bisazo compounds illustrated herein. In another embodiment, there is envisioned a layered photoresponsive device comprised of a supporting substrate, a photoconductive layer comprised of the bisazo compound of the present invention, and situated between the supporting substrate, and the photoconductuive layer a hole transport layer. In one specific illustrative embodiment, the photoresponsive device can be comprised of (1) a supporting substrate, (2) a hole blocking layer, (3) an optional adhesive interface layer, (4) the bisazo photogenerating layer, and (5) a hole transport layer. Thus, a specific photoresponsive device of the present invention can be comprised of a conductive supporting substrate, a hole blocking metal oxide layer in contact therewith, an adhesive layer, a photogenerating layer comprised of the bisazo compounds, respectively, of the formulas as represented by FIGS. 4, 5, 6, 7 or 8 overcoated on the optional adhesive layer, and as a top layer a hole transport layer comprised of certain diamines dispersed in a resinous matrix. The photoconductive layer composition when in contact with the hole transport layer is capable of allowing holes generated by the photogenerating layer to be transported. Examples of aryl amine hole transport molecules that may be selected for the photoconductor devices are illustrated in U.S. Pat. No. 4,265,990, the disclosure of which is totally incorporated herein by reference. Also, examples of charge transport molecules are illustrated in U.S. Pat. No. 4,921,773 and the patents mentioned therein, the disclosures of each of the aforementioned patents, including the '773 patent, being totally incorporated herein by reference.

The photoresponsive devices described herein can be incorporated into various imaging systems such as those conventionally known as xerographic imaging processes. Additionally, the imaging members of the present invention can be selected for imaging and printing systems with visible light and/or near infrared light. In this embodiment, the photoresponsive devices may be negatively charged, exposed to light in a wavelength of from about 400 to about 700, and preferably 400 to 680 nanometers, either sequentially or simultaneously, followed by developing the resulting image and transferring to paper.

BRIEF DESCRIPTION OF THE FIGURES

For a better understanding of the features of the present invention, the following detailed description of various embodiments is provided wherein.

DESCRIPTION OF SPECIFIC EMBODIMENTS

Specific embodiments of the invention will now be illustrated, it being noted that substantially equivalent imaging members are also embraced within the scope of the present invention.

Figure 1:
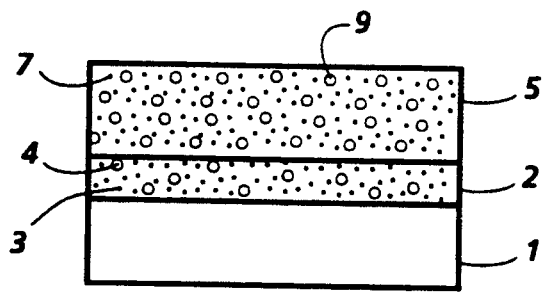
FIGS. 1, 2, and 3 are partially schematic views of examples of photoconductive imaging members of the present invention, and FIGS. 4, 5, 6, 7, 8, and, 9 with 9 being the general formula, represent bisazos of the present invention.

FIG. 1 illustrates a photoconductive imaging member of the present invention comprising a supporting substrate 1, a photogenerating layer 2 comprising the bisazo 3 of the formulas illustrated herein optionally dispersed in a resinous binder composition 4, and a charge carrier hole transport layer 5, which comprises hole transporting molecules 7 dispersed in an inactive resinous binder composition 9.

Figure 2:
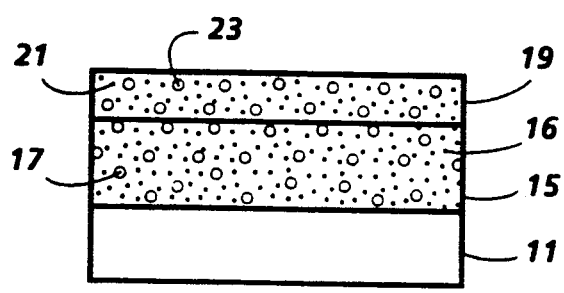

FIG. 2 illustrates essentially the same member as that shown in FIG. 1 with the exception that the hole transport layer is situated between the supporting substrate and the photogenerating layer. More specifically, this figure illustrates a photoconductive imaging member comprising a supporting substrate 11, a hole transport layer 15 comprising aryl amine hole transport molecules 16 dispersed in an inactive resinous binder composition 17, and a photogenerating layer 19 comprising the bisazo compound 21 of the formula of FIG. 9 as illustrated herein, especially those as represented by FIGS. 4, 5, 6, 7, or 8 optionally dispersed in a resinous binder composition 23.

Figure 3:
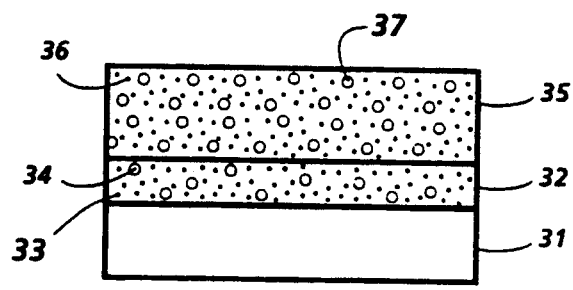
Figure 4:
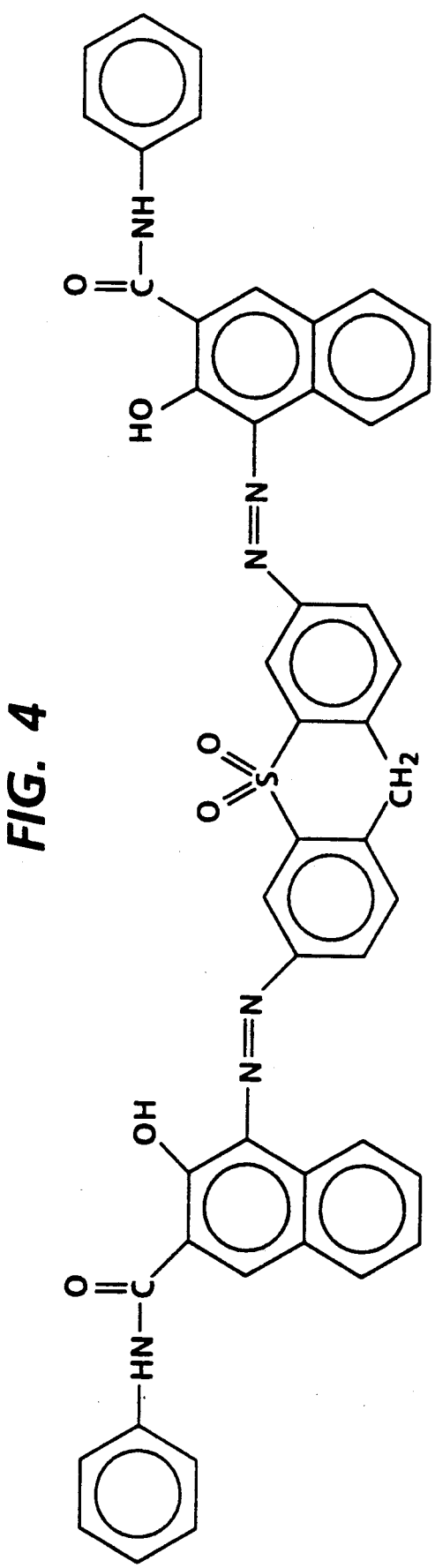
Figure 5:
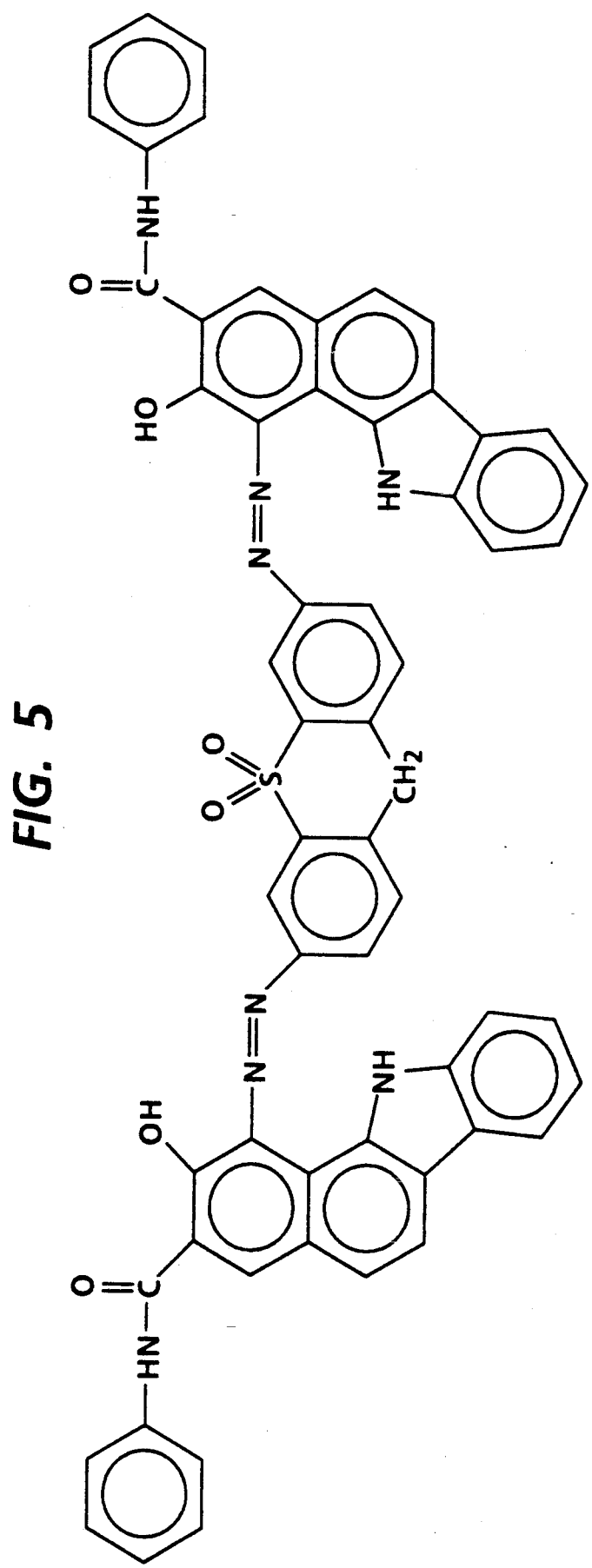
Figure 6:
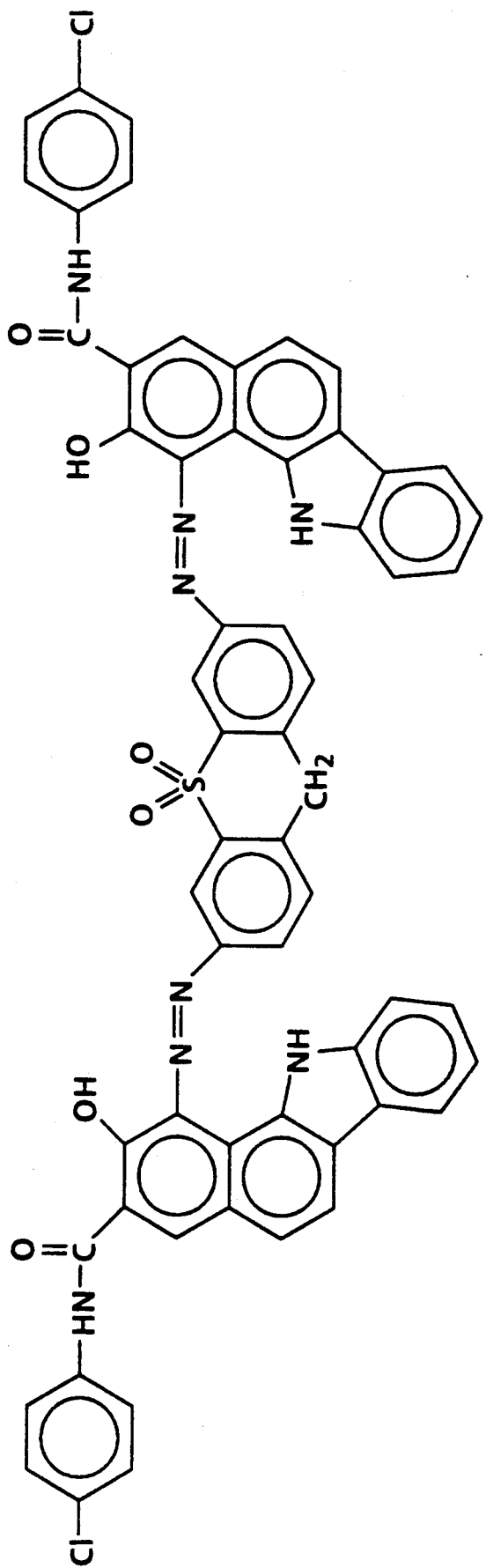
Figure 7:
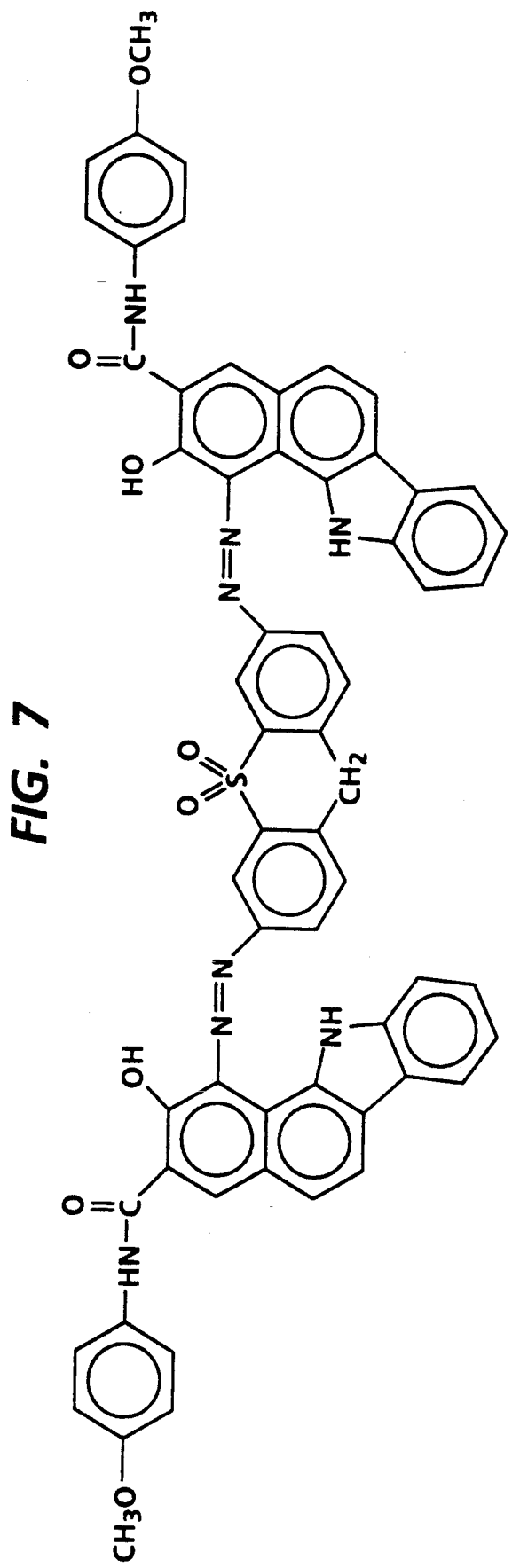

FIG. 3 illustrates a photoconductive imaging member of the present invention comprising a supporting substrate 31, a photogenerating layer 32 comprising the bisazo 33, especially those as represented by FIGS. 4, 5, 6, or 7, including 3,6-bis(1'-azo-2'-hydroxy-11'H-benzo(a)carbazole-3'-carbox-o-ethylanilide)thioxanthene-10,10-dioxide, optionally dispersed in a resinous binder composition 34, and a charge carrier hole transport layer 35 which comprises hole transporting molecules 36 dispersed in an inactive resinous binder composition 37.

The supporting substrate of the imaging members may comprise an insulating material such as an inorganic or organic polymeric material, including MYLAR ®, a commercially available polymer; a layer of an organic or inorganic material having a semiconductive surface layer such as indium tin oxide or aluminum arranged thereon; or a conductive material such as aluminum, titanium, chromium, nickel, brass, or the like. The substrate may be flexible, seamless, or rigid and may have a number of different configurations, such as a plate, a cylindrical drum, a scroll, an endless flexible belt, and the like. In one embodiment, the substrate is in the form of an endless flexible belt. In some situations, it may be desirable to coat an anticurl layer, such as polycarbonate materials commercially available as MAKROLON ®, on the back of the substrate, particularly when the substrate is an organic polymeric material.

The thickness of the substrate layer depends on a number of factors, including economic considerations, the components of the other layers, and the like. Thus, this layer may be of substantial thickness, for example up to 125 mils, or of minimal thickness provided that there are no adverse effects on the system. In embodiments, the thickness of this layer is from about 3 mils to about 20 mils.

Generally, the bisazo photogenerating layer has a thickness of from about 0.05 micron to about 10 microns or more, and preferably has a thickness of from about 0.1 micron to about 4 microns. The thickness of this layer, however, is dependent primarily upon the photogenerating weight loading, which may vary from about 5 to 100 percent, the components of the other layers, and the like. Generally, it is desirable to provide this layer in a thickness sufficient to absorb a substantial amount, for example, from about 80 to about 90 percent or more, of the incident radiation which is directed upon it in the imagewise or printing exposure step. The maximum thickness of this layer is dependent primarily upon factors such as mechanical considerations, such as the specific bisazo compound selected, the thicknesses of the other layers, and whether a flexible photoconductive imaging member is desired. Optionally, resin binders for the photogeneration layer include poly(vinyl acetal) such as polyvinyl formal, and the like.

The hole transport layer can be comprised of various components providing, for example, that they effectively transport charges (holes) such as an aryl amine compound dispersed in a resinous binder and other components, reference the '773 patent mentioned herein, the disclosure of which is totally incorporated herein by reference, and U.S. Pat. No. 4,933,245, the disclosure of which is totally incorporated herein by reference. In one embodiment, the hole transport layers are comprised of aryl amine compounds of the formula:

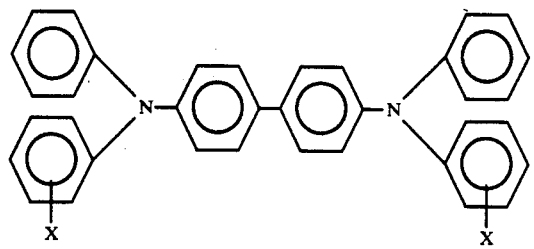

wherein X is selected from the group consisting of alkyl and halogen. Preferably, X is selected from the group consisting of methyl and chloride in either the ortho, meta, or para positions. Suitable inactive binder materials for the hole transport layer include known highly insulating resins, which generally have a resistivity of at least $10^{12}$ ohm-cm to prevent undue dark decay. Compounds corresponding to the above formula include N,N'-diphenyl-N,N'-bis(alkylphenyl)-[1,1'-biphenyl]-4,4'-diamine, wherein alkyl is selected from the group consisting of methyl, such as 2-methyl, 3-methyl and 4-methyl, ethyl, propyl, butyl, hexyl, and the like. With halo substitution, the amine is N,N'-diphenyl-N,N'-bis(-halo phenyl)-[1,1'-biphenyl]-4,4'-diamine, wherein halo is 2-chloro, 3-chloro or 4-chloro. Other electrically active small molecules that can be dispersed in the electrically inactive resin to form a layer which will transport holes include bis(4-diethylamino-2-methylphenyl)-phenyl methane, 4',4"-bis(diethylamino)-2',2"-dimethyltriphenyl methane, bis-4-(diethylaminophenyl)phenyl methane, and 4,4'-bis(diethylamino)-2,2'-dimethyltriphenyl methane. Generally, the hole transport layer has a thickness of from about 5 to about 75 microns, and preferably of from about 10 to about 40 microns.

Examples of highly insulating and transparent resinous components or inactive binder resinous material for the transport layer include materials such as those described in U.S. Pat. No. 3,121,006, the disclosure of which is totally incorporated herein by reference. Specific examples of suitable organic resinous materials include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binder materials are polycarbonate resins having a molecular weight of from about 20,000 to about 100,000 with a molecular weight in the range of from about 50,000 to about 100,000 being particularly preferred. The materials most preferred as electrically inactive resinous materials in embodiments of the present invention are poly(4,4'-dipropylidinediphenyline carbonate) with a weight average molecular weight of from about 35,000 to about 40,000 available as LEXAN ™ 145 from General Electric Company; poly(4,4'-isopropylidine-diphenyline carbonate) with a weight average molecular weight of from about 40,000 to about 45,000 available as LEXAN ™ 141 from General Electric Company; a polycarbonate resin having a weight average molecular weight of from about 50,000 to about 100,000 available as MAKROLON® from Farbenfabricken Bayer AG; and a polycarbonate having a weight average molecular weight of from about 20,000 to about 50,000 available as MERLON® from Mobay Chemical Company. Generally, the resinous binder contains from about 10 to about 75 percent by weight of the active material corresponding to the foregoing formula, and preferably from about 35 percent to about 50 percent of this material. Examples of binder material for the bisazo photogenerating layer are poly(vinyl acetals), polycarbonates as mentioned herein, polyesters, polyvinyl carbazole, and the like. Typical effective amounts of binder can be selected including, for example, from about 5 to about 95, and preferably from about 10 to about 70 weight percent, in embodiments of the present invention.

The photoconductive imaging member may optionally contain a hole blocking layer situated between the supporting substrate and the photogenerating layer. This layer may comprise metal oxides, such as aluminum oxide and the like, or materials such as silanes, nylons, and the like. The primary purpose of this layer is to prevent hole injection from the substrate during and after charging. Typically, this layer is of a thickness of about 5 to about 300 Angstroms, although it may be as thick as 2 microns in some instances.

In addition, the photoconductive imaging member may also optionally contain an adhesive interface layer situated between the hole blocking layer and the photogenerating layer. This layer may comprise a polymeric material such as polyester, polyvinyl butyral, polyvinyl pyrrolidone and the like. Typically, this layer is, for example, of a thickness of less than about 0.6 micron with a thickness range of from about 0.05 to about 1 micron being suitable in embodiments of the present invention.

Imaging members of the present invention exhibit excellent xerographic properties in embodiments thereof. For example, values for dark development potential ($V_{ddp}$) can range from about −400 to about −975. Preferred ranges for dark development potential for the imaging members of the present invention are usually about −400 to −900 volts with −800 volts being especially preferred in embodiments. High dark development potentials permit high contrast potentials, which result in images of high quality with essentially no background development.

The imaging members of the present invention in embodiments thereof also exhibit low dark decay values of, for example, about −50 volts per second or less. Low dark decay values can be of importance for developing high quality images since dark decay measures the amount of charge that disappears after charging of the photoreceptor, and a large difference in charge between exposed and unexposed areas of the photoreceptor results in images with high contrast. Acceptable values for dark decay vary depending on the design of the imaging apparatus in which the imaging members are contained. This dark decay may be as high as −100 volts per second with −50 volts and −10 to −20 volts per second being preferred in embodiments.

Residual potential values ($V_R$) for the imaging members of the present invention in embodiments thereof are excellent, ranging from, for example, about −5 volts to about −50 volts. Residual potential is a measure of the amount of charge remaining on the imaging member after erasure by exposure to light and prior to imaging. Residual potentials of −5 to −15 are considered very exceptional.

Photosensitivity values ($E_{0.5ddp}$ at 600 nanometers) for the imaging members of the present invention in embodiments thereof are acceptable and in some instances excellent, and can be, for example, from about 4 to about 25 ergs per square centimeter. Acceptable photosensitivity values vary depending on the design of the imaging apparatus in which the imaging members are contained; thus in some instances, values as high as 40 or 50 are acceptable, and values of about 5 can be preferred.

The present invention also encompasses a method of generating images with the photoconductive imaging members disclosed herein. The method comprises the steps of generating an electrostatic image on a photoconductive imaging member of the present invention, subsequently developing the electrostatic image with known developer compositions comprised of resin particles, pigment particles, additives, including charge control agents and carrier particles, reference U.S. Pat. Nos. 4,558,108; 4,560,535; 3,590,000; 4,264,672; 3,900,588; and 3,849,182, the disclosures of each of these patents being totally incorporated herein by reference, transferring the developed electrostatic image to a suitable substrate, and permanently affixing the transferred image to the substrate. Development of the image may be achieved by a number of methods, such as cascade, touchdown, powder cloud, magnetic brush, and the like. Transfer of the developed image to a substrate may be by any method, including those wherein a corotron or a biased roll is selected. The fixing step may be performed by means of any suitable method, such as flash fusing, heat fusing, pressure fusing, vapor fusing, and the like.

The imaging members of the present invention can be prepared by a number of different known processes such as those illustrated in U.S. Ser. No. 07/617,234, the disclosure of which is totally incorporated herein by reference. In one process embodiment, the bisazo photogenerator is coated onto a supporting substrate with a Bird applicator, for example, followed by the solution coating of the charge transport layer, and thereafter drying in, for example, an oven.

The following examples are being supplied to further define various species of the present invention, it being noted that these examples are intended to illustrate and not limit the scope of the present inventin. Parts and percentages are by weight unless otherwise indicated.

EXAMPLE I 3,6-Thioxanthenediamine-10,10-dioxide, 1.30 grams, 5 millimoles, was stirred in 20 milliliters of 18 percent hydrochloric acid at 50° to 60° C. for about 1 hour and then at room temperature, about 25° C. overnight, about 18 hours. The resulting light yellow dispersion was then cooled to 0° to 5° C. by an ice water bath. A cold aqueous solution of NaNO₂ (1 gram in 2.5 milliliters of water) was then added dropwise through a pressure equalizing funnel. After the addition was complete, the resulting mixture was stirred in an ice bath for 45 minutes. A very dark aqueous solution of tetrazonium dichloride resulted. This dark solution was filtered by a medium sintered glass funnel, and the filtrate was collected in a precooled 250 milliliters filtration flask. Hexafluorophosphoric acid (10 milliliters) was then added to the flask, and the resulting mixture was stirred for another 30 minutes. A dark solid precipitate was obtained and was isolated by filtration. After washing with cold water, acetic acid and diethyl ether, the product was suction dried to yield the tetrazonium salt, thioxanthene-10,10-dioxide-3,6-tetrazonium bis(-hexafluorophosphate), about 2.2 grams (about 81 percent). IR (KBr): 2,296 cm$^{-1}$ (N+triple bond N).

The above prepared tetrazonium salt was dissolved in about 40 milliliters of cold DMF (dimethylformamide) inside a 3-neck 1 liter flask surrounded by an ice water bath. A cold DMF solution containing 2.7 grams (about 10.2 millimoles) of 2-hydroxy-3-naphthanilide was added into the salt solution in about 25 minutes. Subsequently, a cold aqueous solution of NaOAc (5 grams in 75 milliliters of water) was introduced slowly (in 30 minutes). A dark red precipitate was obtained and the product mixture was allowed to stir at room temperature overnight. The crude pigment produced was isolated by filtration (fine sintered glass funnel). The pigment product was purified by washing with warm water (2×250 milliliters at 80° C.), warm DMF, 250 milliliters at 80° C., acetone, 2×250 milliliters, and diethyl ether, 250 milliliters, to yield a dark red pigment of 3,6-bis(1'-azo-2'-hydroxy-3'-naphthanilide)thioxanthene-10,10-dioxide, 1.43 grams, about a 35 percent yield. The melting point of the aforementioned bisazo was about 320° C.

IR (KBr): 1,675 cm$^{-1}$ (C=O)

Analysis Calculated for: $C_{47}H_{32}N_6O_6S$: C 69.79, H 3.99, N 10.39; Found: C 67.90, H 3.84, N 10.80.

EXAMPLE II

The process of Example I was repeated with the exception that 2-hydroxy-11H-benzo(a)carbazole-3-carbox-o-ethylanilide was selected in place of 2-hydroxy-3-naphthanilide, hereby yielding 3,6-bis(1'-azo-2-hydroxy-11'H-benzo(a)carbazole-3'-carbox-o-ethylanilide)thioxanthene-10,10-dioxide, 2.8 grams, (54 percent yield).

IR (KBr): 1,677 cm$^{-1}$ (C=O)

Analysis Calculated for: $C_{63}H_{46}N_8O_6S$: C 72.54, H 4.44, N 10.74; Found: C 70.91, H 4.41, N 11.51.

EXAMPLE III

The process of Example I was repeated with the exception that 2-hydroxy-11H-benzo(a)carbazole-3-carboxanilide was selected in place of 2-hydroxy-3-naphthanilide, thereby yielding 3,6-bis(1'-azo-2'-hydroxy-11'H-benzo(a)carbazole-3'-carbox-anilide)thioxanthene-10,10-dioxide, 2.47 grams, (50 percent yield) with a melting point of about 330° C.

IR (KBr): 1,674 cm$^{-1}$ (C=O)

Analysis Calculated for: $C_{59}H_{38}N_8O_6S$: C 71.79, H 3.88, N 11.35; Found: C 69.50, H 3.75, N 12.23.

EXAMPLE IV

The process of Example I was repeated with the exception that 2-hydroxy-11H-benzo(a)carbazole-3-carbox-p-chloroanilide was selected in place of 2-hydroxy-3-naphthanilide, thereby yielding 3,6-bis(1'-azo-2'-hydroxy-11'H-benzo(a)carbazole-3'-carbox-p-chloroanilide)thioxanthene-10,10-dioxide, 2.65 grams, (50 percent yield) with a melting point of about 330° C.

IR (KBr): 1,670 cm$^{-1}$ (C=O)

Analysis Calculated for: $C_{59}H_{36}N_8O_6SCl_2$: C 67.11, H 3.44, N 10.61; Found: C 66.87, H 3.37, N 11.43.

EXAMPLE V

The process of Example I was repeated with the exception that 2-hydroxy-11H-benzo(a)carbazole-3-carbox-p-methoxyanilide was selected in place of 2-hydroxy-3-naphthanilide, thereby yielding 3,6-bis(1'-azo-2'-hydroxy-11'H-benzo(a)carbazole-3'-carbox-p-methoxyanilide) thioxanthene-10,10-dioxide, 2.94 grams, (56 percent yield) with a melting point of about 320° C.

IR (KBr): 1,670 cm$^{-1}$ (C=O)

Analysis Calculated for: $C_{61}H_{42}N_8O_8S$: C 69.97, H 4.04, N 10.70; Found: C 68.63, H 3.87, N 11.20.

EXAMPLE VI

Figure 8:
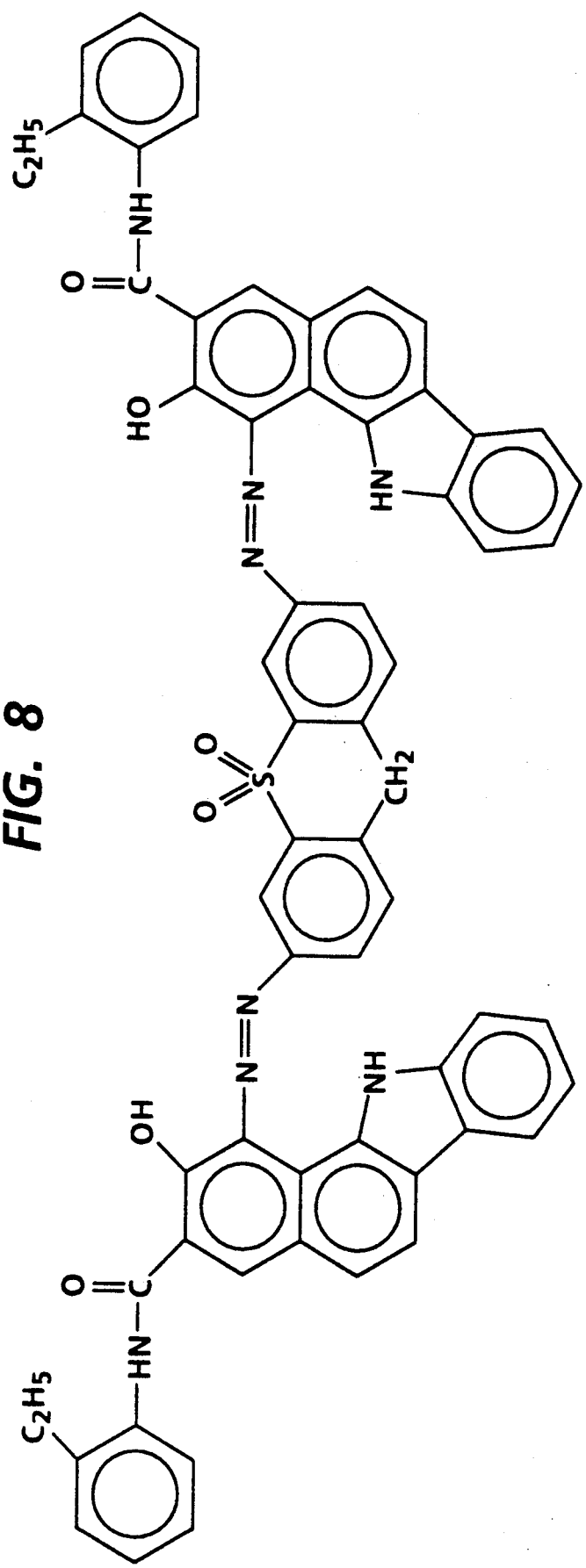
Figure 9:
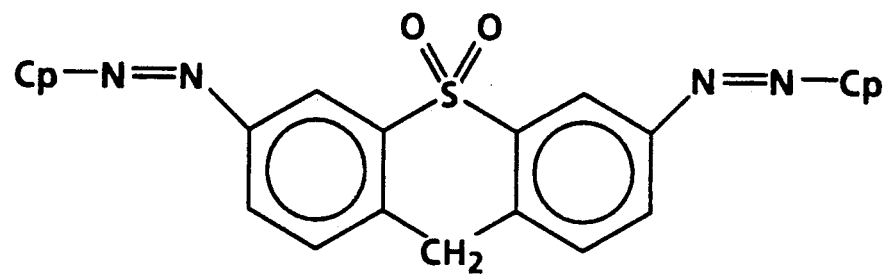

A photoconductive imaging member was prepared with the azo bis photogenerating pigment of Example II, FIG. 8, as follows. To a 1 ounce amber bottle there were added 52.8 milligrams of polyvinyl formal (obtained from Scientific Polymer Products, Inc., formal content 82 percent, acetate content 12 percent, hydroxy content 6 percent) and 10 milliliters of tetrahydrofuran. To the bottle was then added 211.2 grams of the bisazo pigment of Example II, and about 90 grams of steel shot (⅛ inch diameter, number 302 stainless steel shot). The bottle was then placed on a Red Devil Paint Conditioner (Model 5100X) and shaken for about 30 minutes. The resulting dispersion was coated onto a 7.5 inch by 10 inch brush grained aluminum substrate obtained from Ron Ink Company using a Gardner Mechanical Drive with a 6 inch wide Bird Film Applicator (0.5 mil wet gap) inside a humidity controlled glove box. The relative humidity of the glove box was controlled by dry air to about 25 percent or less. The resulting charge generator layer was air dried for about 30 minutes and then vacuum dried for about 1 hour at 100° C. The thickness of the charge generator layer was about 0.5 micron as estimated from TEM micrographs.

The above charge generator layer was overcoated with a hole transport layer comprised of 60 weight percent of the polycarbonate MAKROLON ® obtained from Larkensabricken Bayer AG, and 40 percent of aryl diamine hole transport molecules prepared as follows. A solution containing 4.2 grams of MAKROLON ®, a polycarbonate resin obtained from Larbensabricken Bayer A.G., 2.8 grams of N,N'-bis(3''-methylphenyl)-1,1'-biphenyl-4,4'-diamine prepared as disclosed in U.S. Pat. No. 4,265,990, the disclosure of which is totally incorporated herein by reference, was prepared by dissolving the above materials in 31 milliliters of methylene chloride inside a 2 ounce amber bottle. The hole transport layer was obtained by coating the solution onto the charge generator layer using a 3.5 inch wide, 5 mil wet gap Bird Film Applicator, resulting in a transport layer about 27 microns thick. The resulting photoconductive device was air dried for about 1 hour and vacuum dried at 100° C. for about 16 hours before evaluation on a flat plate imaging test fixture. More specifically, the imaging member thus prepared was evaluated as follows. Xerographic measurements were made on a flat plate scanner using 2 inch by 2.5 inch samples of the imaging member prepared as described herein. The surface potential of the device was monitored with a capacitively coupled ring probe connected to a Keithley electrometer (Model 610C) in the Coulomb mode. The output of the electrometer was displayed on a strip chart recorder (HP Model 740A) which was calibrated by applying known voltage on an uncoated aluminum substrate. The exposure wavelength and the intensity were selected and adjusted using interference and neutral density filters, respectively. With the shutter closed, the dark decay was measured. With the shutter open, the photosensitivity at a known light exposure was recorded. The imaging member was charged to about $-1,000$ volts at the peak voltage and was allowed to discharge in the dark for 2 to 3 seconds to determine the dark decay. Subsequently, the imaging member was exposed to an erase lamp to photodischarge the surface charge and to determine its residual voltage ($V_R$). Thereafter, the imaging member was charged in a similar manner and exposed to visible radiation at the dark development potential, and the sensitivity of the member was determined in terms of $E_{\frac{1}{2}}$, which represents the energy required to discharge half of the dark development potential. The imaging member exhibited a dark development potential ($V_{ddp}$) of $-900$ volts, a dark decay of $-56$ volts per second, an $E_{0.5ddp}$, the energy to discharge half the potential, at 400 nanometers (erg/cm$^2$) of 16.4, an $E_{0.5ddp}$, the energy to discharge half the potential, at 520 nanometers (erg/cm$^2$) of 21, an $E_{0.5ddp}$, the energy to discharge half the potential, at 600 nanometers (erg/cm$^2$) of 22, an $E_{0.5ddp}$, the energy to discharge half the potential, at 650 nanometers (erg/cm$^2$) of 23, and an $E_{0.5ddp}$, the energy to discharge half the potential, at 700 nanometers (erg/cm$^2$) of 38.

The above photoreceptor device was then incorporated into a xerographic imaging test fixture and there resulted, subsequent to development of the formed latent images with a toner comprised of 88 percent by weight of styrene n-butyl methacrylate (58/42) resin particles, 10 percent by weight of REGAL ® 330 carbon black, and 3 percent by weight of the charge additive distearyl dimethyl ammonium methyl sulfate, copies of excellent resolution and high quality.

EXAMPLE VII

Photoconductive imaging members were prepared by repeating the process of Example VI with the exceptions that the bisazo photogenerating pigments as represented by the formulas of FIGS. 4 to 8 were selected, and substantially similar results were obtained.

Other modifications of the present invention will occur to those skilled in the art subsequent to a review of the present application. These modifications, and equivalents thereof are intended to be included within the scope of this invention.

What is claimed is:

1. A photoconductive imaging member comprised of a supporting substrate, a photogenerating layer comprised of a bisazo essentially as represented by the formulas of FIGS. 4, 5, 6, 7, or 8, and a hole transport layer.

2. A photoconductive imaging member in accordance with claim 1 wherein the photogenerating layer is situated between the supporting substrate and the hole transport layer.

3. A photoconductive imaging member in accordance with claim 1 wherein the hole transport layer is situated between the supporting substrate and the photogenerating layer.

4. A photoconductive imaging member in accordance with claim 1 wherein the photoconductive imaging member includes a metal oxide hole blocking layer situated between the supporting substrate and the photogenerating layer.

5. A photoconductive imaging member in accordance with claim 4 wherein the metal oxide is aluminum oxide.

6. A photoconductive imaging member in accordance with claim 4 wherein the metal oxide hole blocking layer has a thickness of less than about 500 Angstroms.

7. A photoconductive imaging member in accordance with claim 4 wherein the photoconductive imaging member contains an adhesive interface layer situated between the supporting substrate and the metal oxide hole blocking layer.

8. A photoconductive imaging member in accordance with claim 7 wherein the adhesive interface layer comprises a polymeric material selected from the group consisting of polyester, polyvinylbutyral, and polyvinyl pyrrolidone.

9. A photoconductive imaging member in accordance with claim 7 wherein the adhesive interface layer has a thickness of less than about 0.6 micron.

10. A photoconductive imaging member in accordance with claim 1 wherein the supporting substrate is a metal.

11. A photoconductive imaging member in accordance with claim 10 wherein the metal is aluminum or titanium.

12. A photoconductive imaging member in accordance with claim 1 wherein the supporting substrate is an organic polymeric composition.

13. A photoconductive imaging member in accordance with claim 1 wherein the supporting substrate has a thickness of from about 3 to about 100 mils.

14. A photoconductive imaging member in accordance with claim 1 wherein the supporting substrate has a thickness of from about 3 to about 20 mils.

15. A photoconductive imaging member in accordance with claim 1 wherein the bisazo layer has a thickness of from about 0.05 to about 10 microns.

16. A photoconductive imaging member in accordance with claim 1 wherein the bisazo photogenerating layer has a thickness of from about 0.1 to about 3 microns.

17. A photoconductive imaging member in accordance with claim 1 wherein the hole transport layer has a thickness of from about 5 to about 50 microns.

18. A photoconductive imaging member in accordance with claim 1 wherein the bisazo compound is dispersed in a resinous binder in an amount of from about 5 percent by weight to about 95 percent by weight.

19. A photoconductive imaging member in accordance with claim 18 wherein the resinous binder is a polyester, polyvinyl butyral, a polycarbonate, polyvinyl carbazole or polyvinyl formal.

20. A photoconductive imaging member in accordance with claim 1 wherein the hole transport layer comprises an aryl amine compound.

21. A photoconductive imaging member in accordance with claim 20 wherein the aryl amine comprises molecules of the formula:

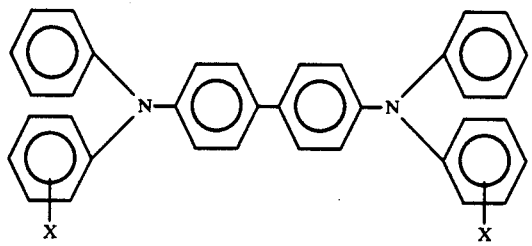

dispersed in a highly insulating and transparent organic resinous binder wherein X is selected from the group consisting of alkyl and halogen.

22. A photoconductive imaging member in accordance with claim 21 wherein X is selected from the group consisting of ortho (CH$_3$), meta (CH$_3$), para (CH$_3$), ortho (Cl), meta (Cl), and para (Cl).

23. A photoconductive imaging member in accordance with claim 21 wherein the resinous binder is a polyester, a polyvinyl butyral, a polystyrene, a polycarbonate, or a polyvinyl formal.

24. A method of imaging which comprises the steps of:
   (a) generating an electrostatic image on the photoconductive imaging member of claim 1;
   (b) subsequently developing the electrostatic image;
   (c) transferring the developed electrostatic image to a suitable substrate; and
   (d) permanently affixing the transferred image to the substrate.

25. A method of imaging in accordance with claim 24 wherein the electrostatic image is developed by cascade, touchdown, powder cloud, or magnetic brush methods.

26. A method of imaging in accordance with claim 24 wherein the developed electrostatic image is transferred to a substrate by means of a corotron or a biased roll.

27. A method of imaging in accordance with claim 24 wherein the substrate is paper.

28. A method of imaging in accordance with claim 24 wherein the substrate is a transparency.

29. A photoconductive imaging member comprised of a supporting substrate, a photogenerating layer comprised of a bisazo compound essentially as represented by the formulas of FIGS. 4, 5, 6, 7 or 8, and a charge transport layer.

30. A photoconductive imaging member comprised of a supporting substrate, a photogenerating layer comprised of the bisazo compounds as represented by the formulas of FIGS. 4, 5, 6, 7 or 8, and thereover and in contact with the photogenerating layer a charge transport layer.

31. A photoconductive imaging member comprised of a photogenerating layer comprised of a bisazo compound essentially as represented by the formulas of FIGS. 4, 5, 6, 7 or 8, and a charge transport layer.

32. A photoconductive imaging member comprised of a photogenerating layer comprised of a bisazo compound as represented by the formulas of FIGS. 4, 5, 6, 7 or 8, and thereover and in contact with the photogenerating layer a hole transport layer.

33. A photoconductive imaging member in accordance with claim 21 wherein the alkyl contains from 1 to about 25 carbon atoms.

34. A photoconductive imaging member comprised of a supporting substrate, a photogenerating layer comprised of a bisazo as represented by the formulas of FIGS. 4, 5, 6, 7 or 8, and thereover and in contact with the photogenerating layer a hole transport layer.

35. A photoconductive imaging member in accordance with claim 1 wherein the bisazo is 3,6-bis(1'-azo-2'-hydroxy-3'-naphthanilide)thioxanthene-10,10-dioxide, 3,6-bis(1'-azo-2-hydroxy-11'H-benzo(a)carbozole-3'-carbox-o-ethylanilide)thioxanthene-10,10-dioxide, 3,6-bis(1'-azo-2'-hydroxy-11'H-benzo(a)carbazole-3'-carboxanilide)thioxanthene-10,10-dioxide, 3,6-bis(1'-azo-2'-hydroxy-11'H-benzo(a)carbazole-3'-carbox-p-chloroanilide)thioxanthene-10,10-dioxide, or 3,6-bis(1'-azo-2'-hydroxy-11'H-benzo(a)carbazole-3'-carbox-p-methoxyanilide)thioxanthene-10,10-dioxide.

* * * * *